Jan. 3, 1956 E. STAMMWITZ 2,729,399

TRAVERSE CAM MECHANISM FOR WINDING MACHINES

Filed June 18, 1951 2 Sheets-Sheet 1

Inventor:
E. Stammwitz
By Glascock Downing & Seebold
Attys.

Jan. 3, 1956 E. STAMMWITZ 2,729,399

TRAVERSE CAM MECHANISM FOR WINDING MACHINES

Filed June 18, 1951 2 Sheets-Sheet 2

INVENTOR.
E. Stammwitz
BY Glascock Downing & Seebold
Attorneys.

United States Patent Office 2,729,399

Patented Jan. 3, 1956

2,729,399

TRAVERSE CAM MECHANISM FOR WINDING MACHINES

Eugen Stammwitz, Kaiserslautern, Rheinpfalz, Germany

Application June 18, 1951, Serial No. 232,136

2 Claims. (Cl. 242—43.7)

With spinning and twisting frames it is frequently required, that the pirns shall be provided before the actual winding with a so-called reserve winding.

The hitherto known constructions interrupt for this purpose the operation of the cam mostly with an engageable or disengageable claw coupling directly behind the delivery cylinder and by this means bring the ring rail to rest for a short time, when the machine is starting up. The result of this is, that as long as the coupling remains disengaged the delivered thread will wind up at one and the same place as reserve turns. In all these cases the cam disc is always rigidly connected to its driving shaft.

Now, for certain purposes it is of advantage for the reserve turns not to be wound at one place on one another, but to be wound in parallel turns of smaller or greater width.

The invention has for its object to provide a solution of the problem of making reserve windings of any desired form. This is effected in a simple manner by the expedient, that in the arrangement according to the invention there is provided on the driving shaft for the lifting motion of the ring rails a cam-shaped disc or the like which moves the ring rail upwards and downwards with a shortened lift during the formation of the reserve winding, or a circular disc or the like which supports the ring rail during the formation of the reserve winding, with which the cam disc mounted loosely on the driving shaft can be coupled and uncoupled. It is thus possible according to the invention by suitably adjusting the coupling to let the disc or the like run for the reserve winding, until the desired length of the reserve turns is reached, whereupon by reversing the coupling the cam disc is brought into operation for actuating the lifting motion of the ring rails. The disc or the like may have any cam swells or may be circular, whereby the ring rail will be brought to rest.

The coupling between the disc or the like for the reserve winding and the cam disc will preferably have the form of a pin coupling.

Furthermore, the cam disc is preferably rotatably mounted on the disc or the like for the reserve winding, which is fixed on the driving shaft of the cam disc, and a control ring which slides over a driving shaft bearing is provided with driving pins which are adapted to be inserted or withdrawn through the cam disc into or out of corresponding holes in the disc or the like for the reserve winding. By actuating the control ring it is thus possible to put the disc or the like for the reserve winding into and out of operation.

Further details of the device according to the invention, more particularly the way it is operated, will be gathered from the constructional example hereinafter described.

Figure 1:
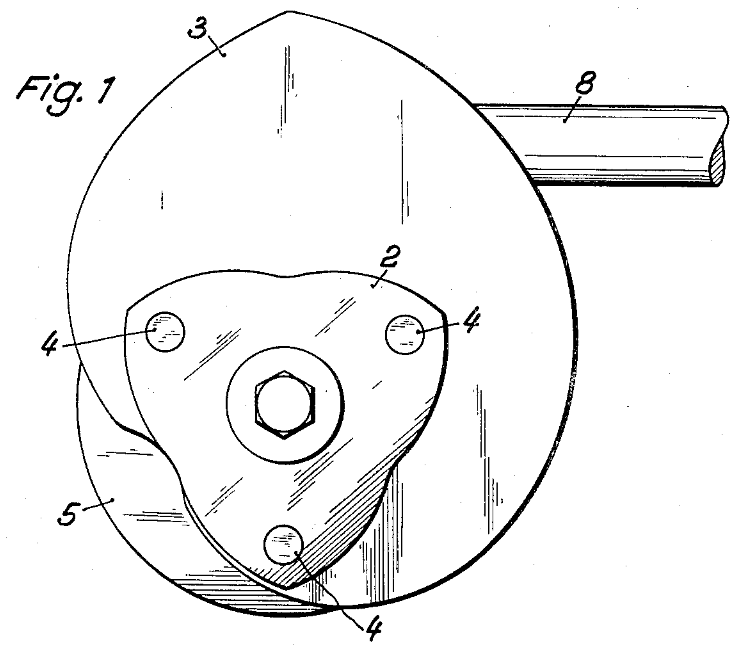
Figure 2:
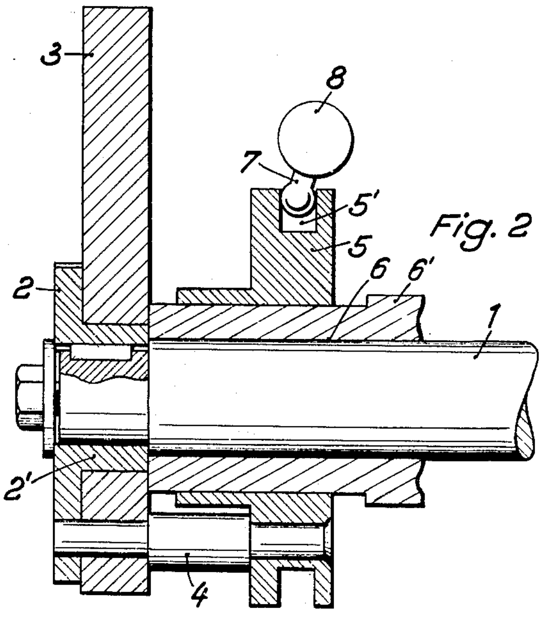

In the accompanying drawing:

Figure 1 shows a front view of the device according to the invention,

Figure 2 a sectional side view through the parts of the device.

Figure 3:
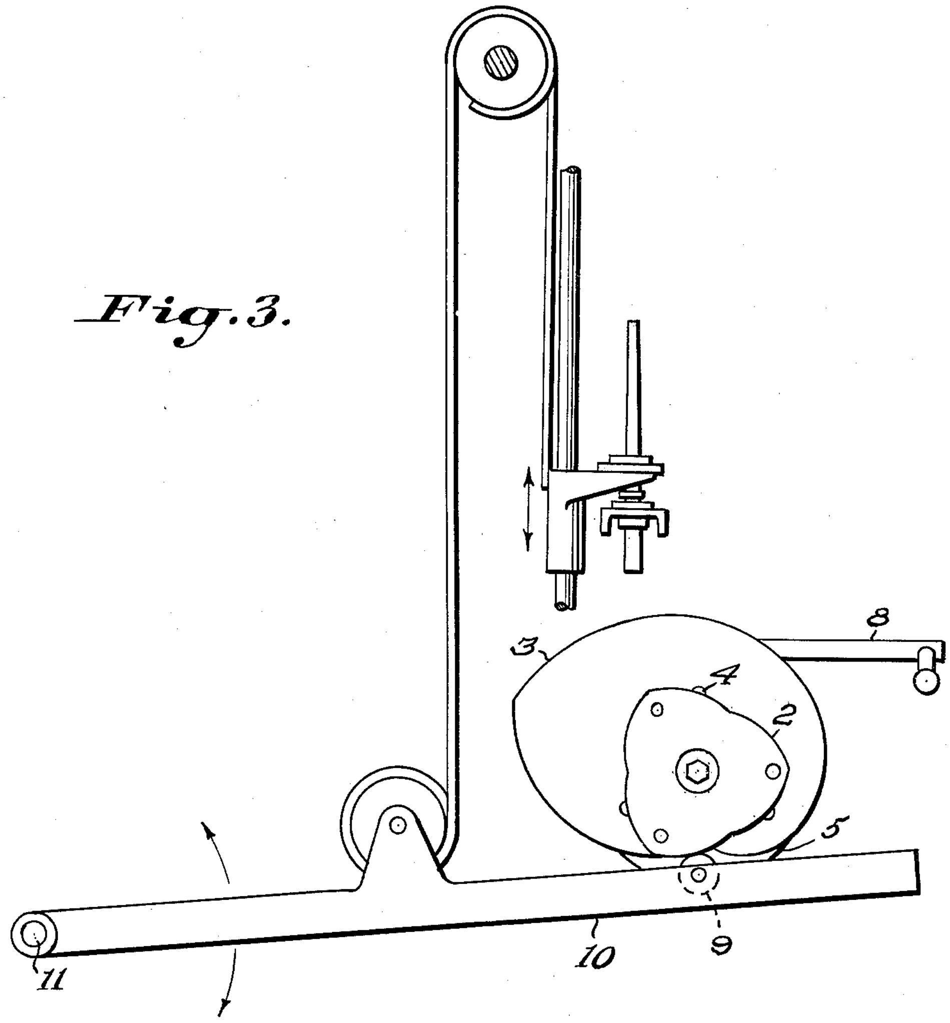

Figure 3 is a front view showing the relationship of the device with respect to the ring rail and the means for reciprocating the ring rail.

On the driving shaft 1 of the cam disc (Figure 2) is fixed the disc 2 for the reserve winding. In the example shown the disc has three cam swells, but may have any desired shape. The disc 2 has a hub-like extension 2', on which the cam disc 3 is loosely mounted. The driving pins 4 which are fixed in the control ring 5 engage through holes in the cam disc 3 in corresponding holes in the disc 2. The control ring 5 is mounted on the driving shaft bearing 6, so as to be capable of turning and sliding on it. In a groove 5' of the control ring there engages the control knob 7 of the control shaft 8. By turning the control shaft 8 to and fro the control ring 5 can thus be moved to and fro, whereby the driving pins 4 fixed in it can be coupled and uncoupled through the cam disc 3 with the disc 2.

In Figure 3, it will be seen that ring rail R is reciprocable, and, arm 10 which is pivoted at 11 reciprocates the ring rail in a conventional fashion. A roller 9 is mounted on the arm 10, and, is engageable by the discs 2 and 3 when such discs are locked together, or, by disc 2 when the disc 3 is uncoupled therefrom. The showing in Figure 3 illustrates the disc uncoupled so that the drive is effected solely by the disc 2 to impart a slight up and down motion to the ring rail for a reserve winding.

The arrangement operates as follows:

Before the machine is started up, the control shaft 8 is turned in the counter-clockwise sense, until the control ring 5 strikes against the shoulder 6' of the shaft bearing 6. During this motion the driving pins are withdrawn out of the disc 2, so that, on the machine being thereupon started up, at first only the disc 2 will take part in the rotary motion, after which it will impart to the ring rail through lifting means of a known kind the desired motion for the reserve turns.

When the desired length of the reserve windings is reached, the control shaft 8 is turned in the clockwise sense, causing the control ring 5 to be displaced to the left and the driving pins 4 to engage with the disc 2, whereupon the cam disc 3 will take part in the rotation of the driving shaft 1 of the cam disc and impart the normal lift to the ring rail.

When with this arrangement the reserve turns are to be wound in one place, the disc 2 described above is exchanged for one of circular shape, that is without any cam swells, causing the ring rail to remain stationary, until the cam disc is coupled up again.

I claim:

1. Means for controlling the formation of a reserve winding on the pirns of spinning, twisting and like frames, comprising a reciprocable ring rail and cam operating means reciprocating the ring rail, such cam operating means including a cam shaft arranged below the ring rail, a bearing for the cam shaft, an apertured cam body, a laterally extending hub on said body fixed to an end of the cam shaft adjacent the bearing with the end of the hub being in facial contact with an end of the bearing, a second apertured cam body journalled on the said hub with one face of said second cam body being adjacent the first cam body and the other face being adjacent the end of the bearing, a control ring journalled on the said bearing and slidable longitudinally along the bearing toward and away from the said cam bodies, drive pins on the said control ring and disposed in the apertures of the second cam body with the control ring in its farthermost position away from the said cam bodies yet movable into the apertures of the first cam body when said ring is moved toward the cam bodies to couple said bodies together to effect one cycle of movement of the cam operating means, and means selectively moving the control ring toward and away from the cam bodies so that when the drive pins are removed from the apertures of the first cam body, the first cam body reciprocates the ring rail until the required length of reserve winding is formed.

2. The means defined in and claimed by claim 1 further characterized in that said bearing is provided with a stop means to limit the farthermost position of the ring away from the cam bodies and said means for selectively moving the control ring includes an annular groove in the ring, a rockable control shaft with its axis disposed perpendicularly to the axis of the cam shaft and pin means extending from the control shaft and lying within the said groove to impart sliding movement in opposite directions to the control ring upon a rocking motion of the control shaft.

References Cited in the file of this patent

UNITED STATES PATENTS

| | | |
|---|---|---|
| 632,743 | Petreano | Sept. 12, 1899 |
| 918,610 | Tschantz | Apr. 20, 1909 |
| 1,211,442 | Hawkins et al. | Jan. 9, 1917 |
| 1,289,498 | McHarry | Dec. 31, 1918 |
| 1,403,480 | Blood | Jan. 17, 1922 |
| 1,425,792 | Pignani | Aug. 15, 1922 |
| 1,506,639 | Hook et al. | Aug. 26, 1924 |
| 1,646,561 | Skedgell | Oct. 25, 1927 |
| 1,651,402 | Midgley | Dec. 6, 1927 |
| 1,835,058 | Kershaw et al. | Dec. 8, 1931 |
| 2,274,446 | Heald | Feb. 24, 1942 |
| 2,610,522 | Kelly | Sept. 16, 1952 |

FOREIGN PATENTS

| | | |
|---|---|---|
| 314,800 | Great Britain | June 5, 1930 |